(12) United States Patent
Yagi

(10) Patent No.: US 8,493,372 B2
(45) Date of Patent: Jul. 23, 2013

(54) IMAGE DISPLAY APPARATUS AND ELECTRONIC APPARATUS

(75) Inventor: Keiichi Yagi, Kanagawa (JP)

(73) Assignee: Japan Display West Inc. (JP)

( * ) Notice: Subject to any disclaimer, the term of this patent is extended or adjusted under 35 U.S.C. 154(b) by 703 days.

(21) Appl. No.: 12/657,947

(22) Filed: Jan. 29, 2010

(65) Prior Publication Data
US 2010/0194722 A1 Aug. 5, 2010

(30) Foreign Application Priority Data

Jan. 30, 2009 (JP) ................................ P2009-020808

(51) Int. Cl.
*G06F 3/038* (2006.01)
(52) U.S. Cl.
USPC ........... 345/204; 345/206; 345/207; 345/158; 33/366.16; 356/139.1
(58) Field of Classification Search
USPC ...... 345/158, 87–102, 699, 204–207; 33/341, 33/343, 366.12, 366.16; 356/139.1
See application file for complete search history.

(56) References Cited

U.S. PATENT DOCUMENTS

| | | | | |
|---|---|---|---|---|
| 5,425,179 A | * | 6/1995 | Nickel et al. | 33/366.16 |
| 6,392,223 B1 | * | 5/2002 | Hjertman et al. | 250/231.1 |
| 6,690,457 B2 | * | 2/2004 | Yamaguchi | 356/139.1 |
| 7,161,138 B2 | * | 1/2007 | Hsu | 250/231.1 |
| 7,612,877 B2 | * | 11/2009 | Lin | 356/139.1 |
| 2007/0261257 A1 | * | 11/2007 | Luo | 33/366.16 |
| 2009/0013544 A1 | * | 1/2009 | Hendriks et al. | 33/366.16 |

FOREIGN PATENT DOCUMENTS

| | | |
|---|---|---|
| JP | 64043713 U | 3/1989 |
| JP | 07064754 A | 3/1995 |
| JP | 11063981 A | 3/1999 |
| JP | 2000002865 A | 1/2000 |
| JP | 2000122575 A | 4/2000 |
| JP | 2005221450 A | 8/2005 |
| JP | 2007057345 A | 3/2007 |
| JP | 2007-147557 A | 6/2007 |

OTHER PUBLICATIONS

English Translation of JP 2000-002865.*
English Translation of JP 11-063981.*
Office Action from Japanese Application No. 2009-020808, dated Feb. 10, 2011.
Office Action from Japanese Application No. 2009-020808, dated Oct. 26, 2010.

* cited by examiner

*Primary Examiner* — Hong Zhou
(74) *Attorney, Agent, or Firm* — Lerner, David, Littenberg, Krumholz & Mentlik, LLP

(57) ABSTRACT

An image display apparatus includes: a circuit board integrally formed with a driving element for driving a display element and a light receiving sensor for receiving light; a light change structure provided in a region of the circuit board, in which the light receiving sensor is formed, and includes a light change material that selectively changes a light receiving amount of the light receiving sensor by moving by itself according to an attitude with respect to a direction of gravitational force; and an attitude determining unit that determines the attitude based on the light receiving amount of the light receiving sensor.

12 Claims, 15 Drawing Sheets

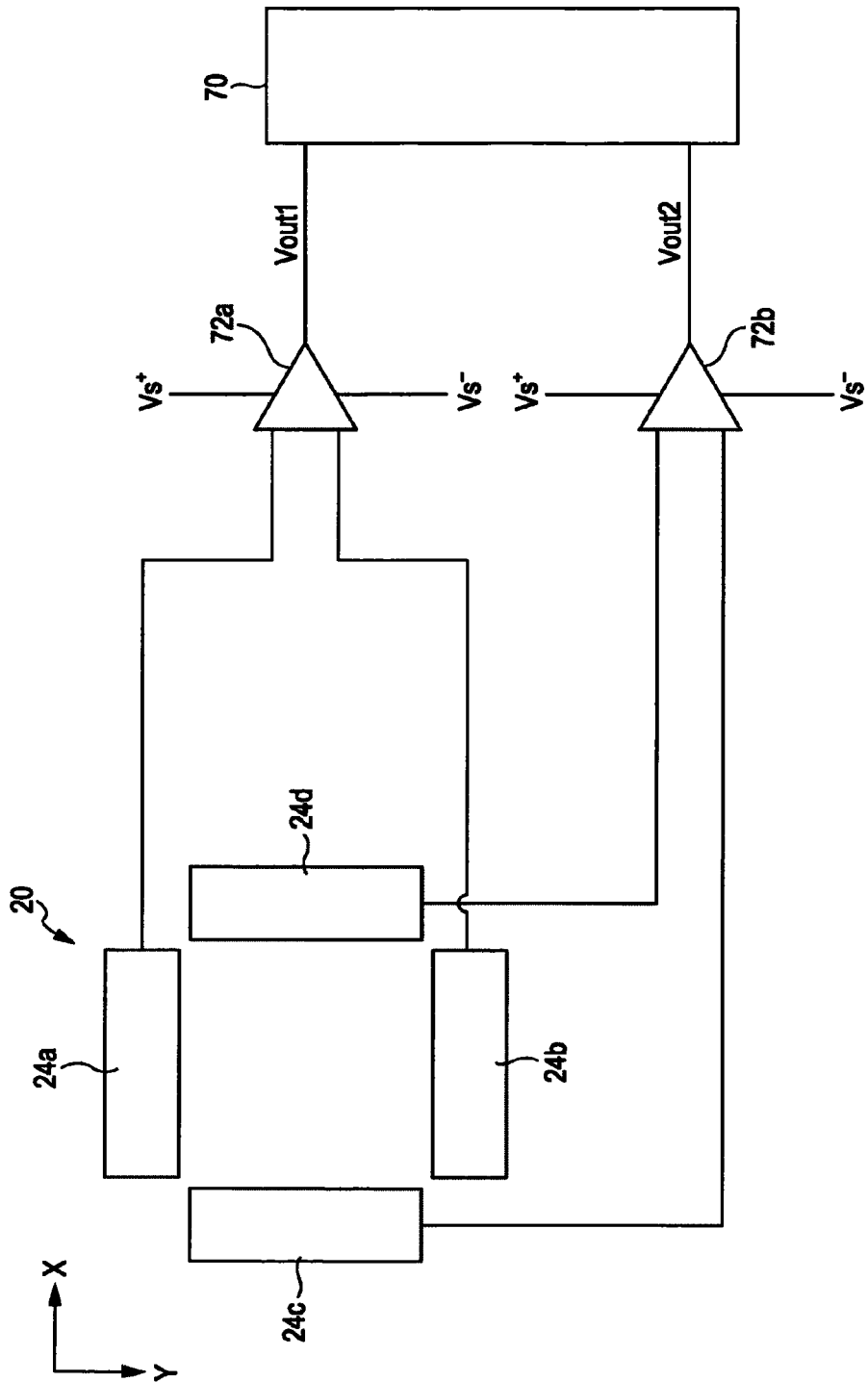

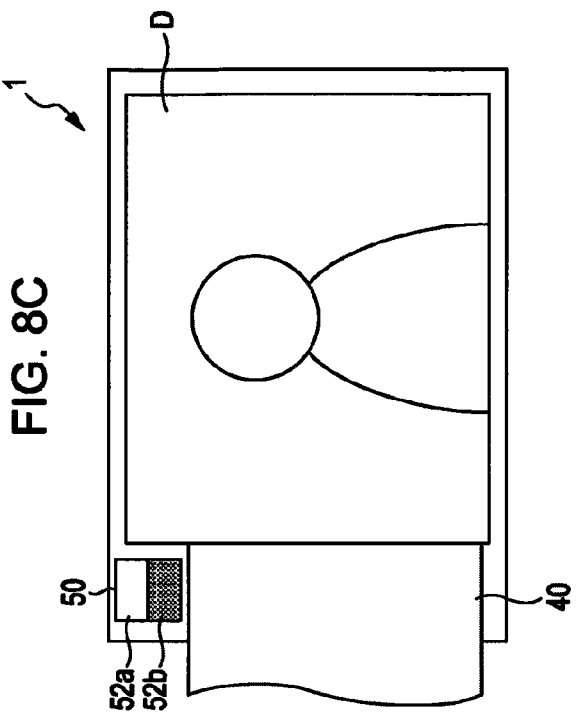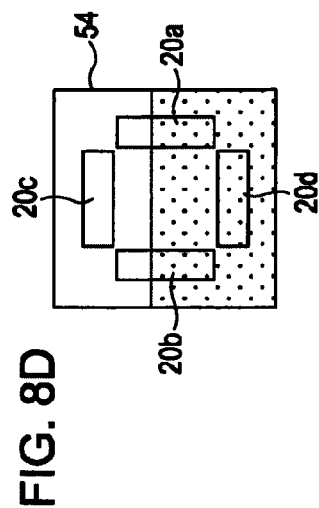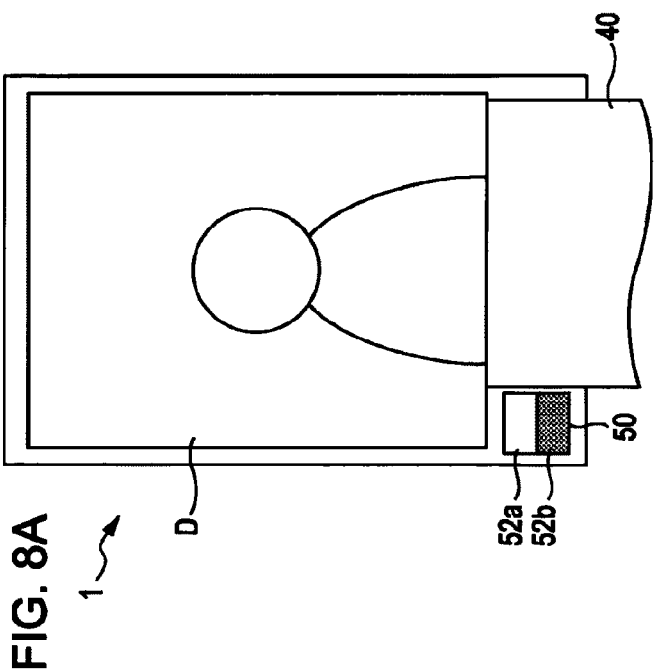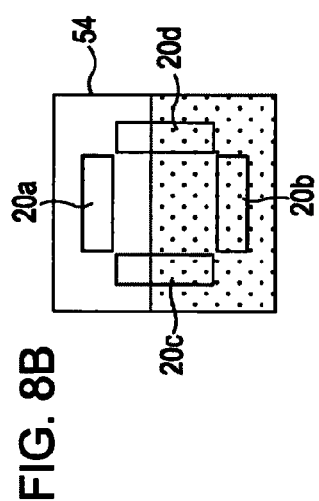

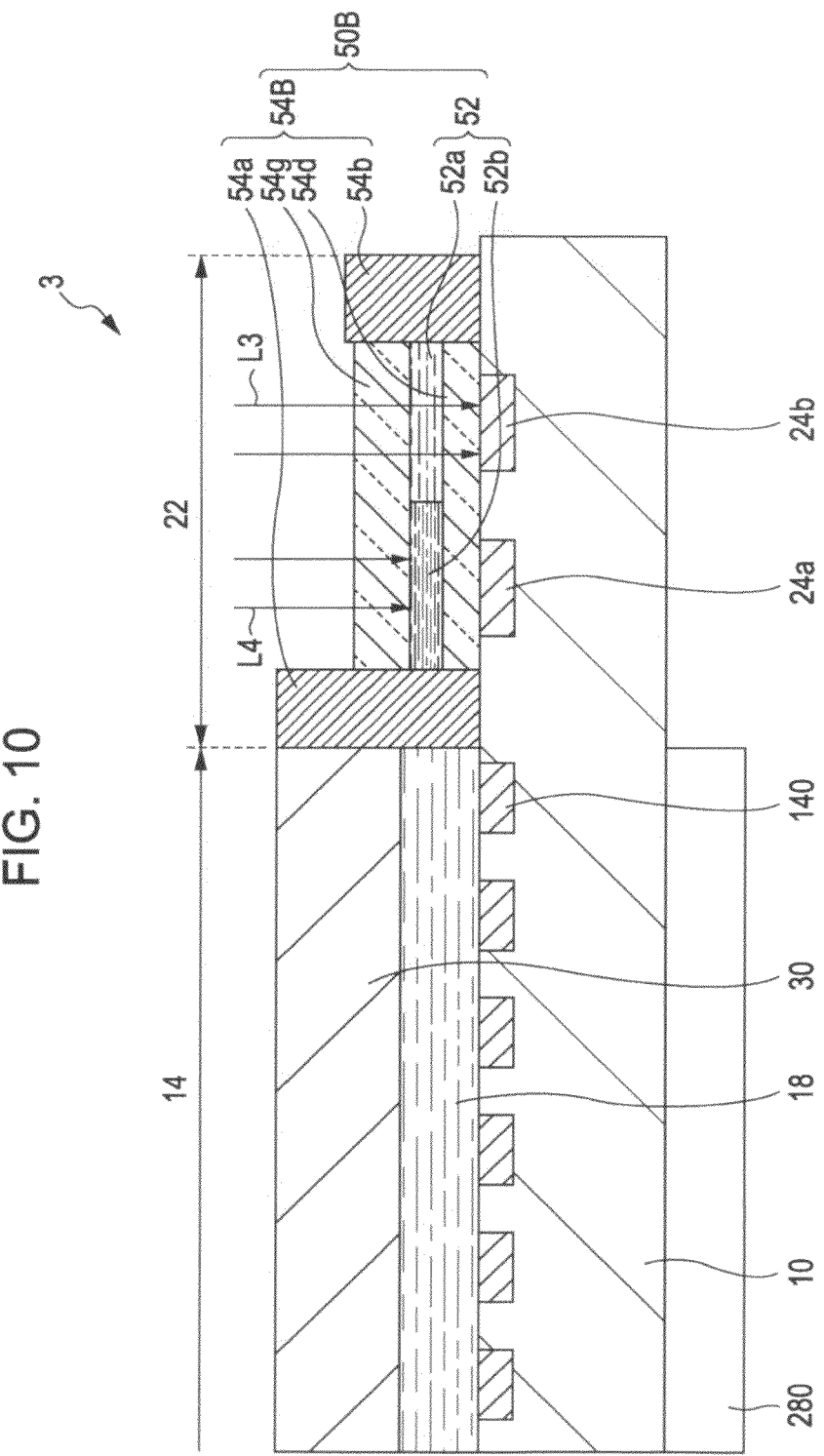

IMAGE DISPLAY APPARATUS AND ELECTRONIC APPARATUS

CROSS-REFERENCE TO RELATED APPLICATION

The present application claims priority from Japanese Patent Application No. JP JP 2009-020808 filed in the Japanese Patent Office on Jan. 30, 2009, the entire content of which is incorporated herein by reference.

BACKGROUND OF THE INVENTION

1. Technical Field

The present invention relates to an image display apparatus having an attitude detection function, and an electronic apparatus having the same.

2. Description of the Related Art

In the related art, there has been a technology of providing an optical sensor, and a light shielding body that selectively blocks a light incident into the optical sensor in response to an attitude with respect to the direction of gravitational force, and detecting the attitude of an apparatus based on the received amount of the light incident into the optical sensor.

For example, Japanese Unexamined Patent Application Publication No. 2007-147557 discloses an angle detecting sensor including a base, a casing, a light receiving element and a light shielding body. The light receiving element is prepared at the base, and the light shielding body with adjustable displacement is supported by a cylindrical inner wall support surface of the casing so as to shield the light receiving element. The light receiving element has a circular acceptance region, and the acceptance region includes four acceptance planes obtained by quadrisecting the area. According to the tilting of the angle detecting sensor, the light-shielding body is displaced by the gravity. If the light-shielding body is displaced, the amount of a light received on each acceptance plane also varies and each acceptance plane outputs analog signals corresponding to each amount of the light received. The analog signals output from each acceptance plane are processed by a signal processing circuit, so that tilting angles of the angle detecting sensor is detected. Thus, the angle detecting sensor can detect tilting angles correctly and stably, even under the conditions where the angle detecting sensor repeats attitude variations, while attempting reduction in size and weight.

SUMMARY OF THE INVENTION

Meanwhile, an apparatus provided with an image display device such as a digital camera or a cell phone, a case occurs in which a function of controlling the image display direction by detecting an attitude thereof is necessary. In order to realize such a function, it is considered to apply the above-described attitude detecting technology. In such a case, for example, a sensor device such as the angle detecting sensor disclosed in Japanese Unexamined Patent Application Publication No. 2007-147557 is generally provided in the housing of the apparatus, separately from the image display device. That is, the sensor device and the image display device are provided in the apparatus while being separated from each other. Thus, in such a case, since an occupation space for installing the sensor device is additionally necessary, it may be difficult to save the space of the apparatus and reduce the size thereof. Further, as a passage of an input/output signal with respect to the sensor device, for example, since an electric signal interconnection device such as a flexible printed circuit (FPC) is additionally necessary, it is advantageous in terms of cost.

In view of the above issues, it is desirable to provide an image display apparatus and an electronic apparatus, capable of realizing an attitude detection function while achieving space saving and cost reduction.

According to one embodiment of the invention, there is provided an image display apparatus including a circuit board integrally formed with a driving element for driving a display element and a light receiving sensor for receiving light, a light change structure provided in a region of the circuit board, in which the light receiving sensor is formed, and includes a light change material that selectively changes a light receiving amount of the light receiving sensor by moving by itself according to an attitude with respect to a direction of gravitational force, and an attitude determining unit that determines the attitude based on the light receiving amount of the light receiving sensor.

According to another embodiment of the invention, there is provided an electronic apparatus including an image display unit, and a control unit that controls the image display unit, wherein the image display unit includes: a circuit board including a driving circuit provided with a driving element for driving a display element and a light receiving sensor for receiving light, the driving circuit being integrally formed with the light receiving sensor; a light change structure provided in a region of the circuit board, in which the light receiving sensor is formed, and includes a light change material that selectively changes a light receiving amount of the light receiving sensor by moving by itself according to an attitude with respect to a direction of gravitational force; and an attitude detection processing unit that determines the attitude based on the light receiving amount of the light receiving sensor.

Herein, in a broad sense, the "light change material" represents a means that changes the amount of light received in the light receiving sensor. In detail, for example, the "light change material" represents a member, a material and the like, which cause variation of transmittance or reflectance. However, the "light change material" may have various shapes such as a solid, powder or a liquid if it can be moved (displaced) in the direction of gravitational direction. Further, the "display element" includes a self-light emission element such as an organic electroluminescence (EL) element, in addition to a non-self-light emission element such as a liquid crystal element demanding an auxiliary light source (backlight) that emits a display light.

According to the image display apparatus and the electronic apparatus of the invention, the circuit board is integrally formed with the driving element for driving the display element and the light receiving sensor for receiving the light. Further, in the region of the circuit board, in which the light receiving sensor is formed, the light change structure, which includes the light change material that selectively changes the light receiving amount of the light receiving sensor by moving by itself according to the attitude with respect to the direction of gravitational force, is provided, and the attitude determining unit determines the attitude based on the light receiving amount of the light receiving sensor. Thus, as compared with the case in which the light receiving sensor is provided separately from the circuit board, as a whole of the apparatus, an occupation space of the light receiving sensor can be reduced. Further, the circuit board is integrally formed with the driving element for driving the display element and the light receiving sensor for receiving the light, so that it is not necessary to separately prepare an electric signal interconnection means (e.g., an FPC) for connecting the light receiving sensor to the circuit board.

According to the image display apparatus and the electronic apparatus of the invention, after the light receiving sensor is integrally formed with the circuit board together with the driving element, in the region of the light receiving sensor of the circuit board, the light change structure, which includes the light change material that selectively changes the light receiving amount of the light receiving sensor by moving by itself according to the attitude with respect to the direction of gravitational force, is formed, and the attitude of the apparatus is determined based on the light receiving amount of the light receiving sensor, so that space saving can be achieved and cost reduction can also be achieved because it is not necessary to separately prepare the electric signal interconnection means for the light receiving sensor.

BRIEF DESCRIPTION OF THE DRAWINGS

FIG. 7 is a schematic view illustrating a connection relation of a light receiving sensor shown in FIG. 2 and an attitude determining unit shown in FIG. 1;

FIGS. 8A to 8D are diagrams schematically illustrating a state of a the light change material of a light change structure and an arrangement position of light receiving elements of a light receiving sensor when the attitude of an image display apparatus shown in FIG. 1 is changed, wherein FIG. 8A illustrates a case in which a display screen is vertically long and FIG. 8B illustrates a case in which a display screen is horizontally long;

FIG. 10 is a sectional view schematically illustrating an image display apparatus according to the second embodiment;

FIGS. 11A and 11B are views illustrating a digital camera as one application of an image display apparatus, wherein FIG. 11A is a front view of the digital camera and FIG. 11B is a rear view of the digital camera;

FIGS. 18A to 18D are schematic diagrams illustrating other light change structures, wherein FIG. 18A is a diagram illustrating a case in which a light change material of the light change structure is light change powder, FIG. 18B is a diagram illustrating a case in which a light change material is a pivoting member having a fan shape being pivotally supported about a rotating shaft, FIG. 18C is a diagram illustrating a case in which a light change material is a pivoting member having a rod shape being pivotally supported about a rotating shaft, and FIG. 18D is a diagram illustrating a case in which a light change material is a weight member in such a manner that the weight member is movably supported by a spring member.

DESCRIPTION OF THE PREFERRED EMBODIMENTS

Hereinafter, preferred embodiments of the invention will be described in detail with reference to the accompanying drawings. Furthermore, the description will be given in order of the following items.

1. First Embodiment (Image Display Apparatus: Example using Backlight)
2. Modification
3. Second Embodiment (Image Display Apparatus: Example using External Light)
4. First Application (Electronic Apparatus: Example of Digital Camera)
5. Second Application (Electronic Apparatus: Example of Cell Phone)
6. Third Application (Electronic Apparatus: Example of Personal Computer)
7. Fourth Application (Electronic Apparatus: Example of Video Camera)
8. Other Embodiments

First Embodiment

[Apparatus Configuration]

Figure 1:
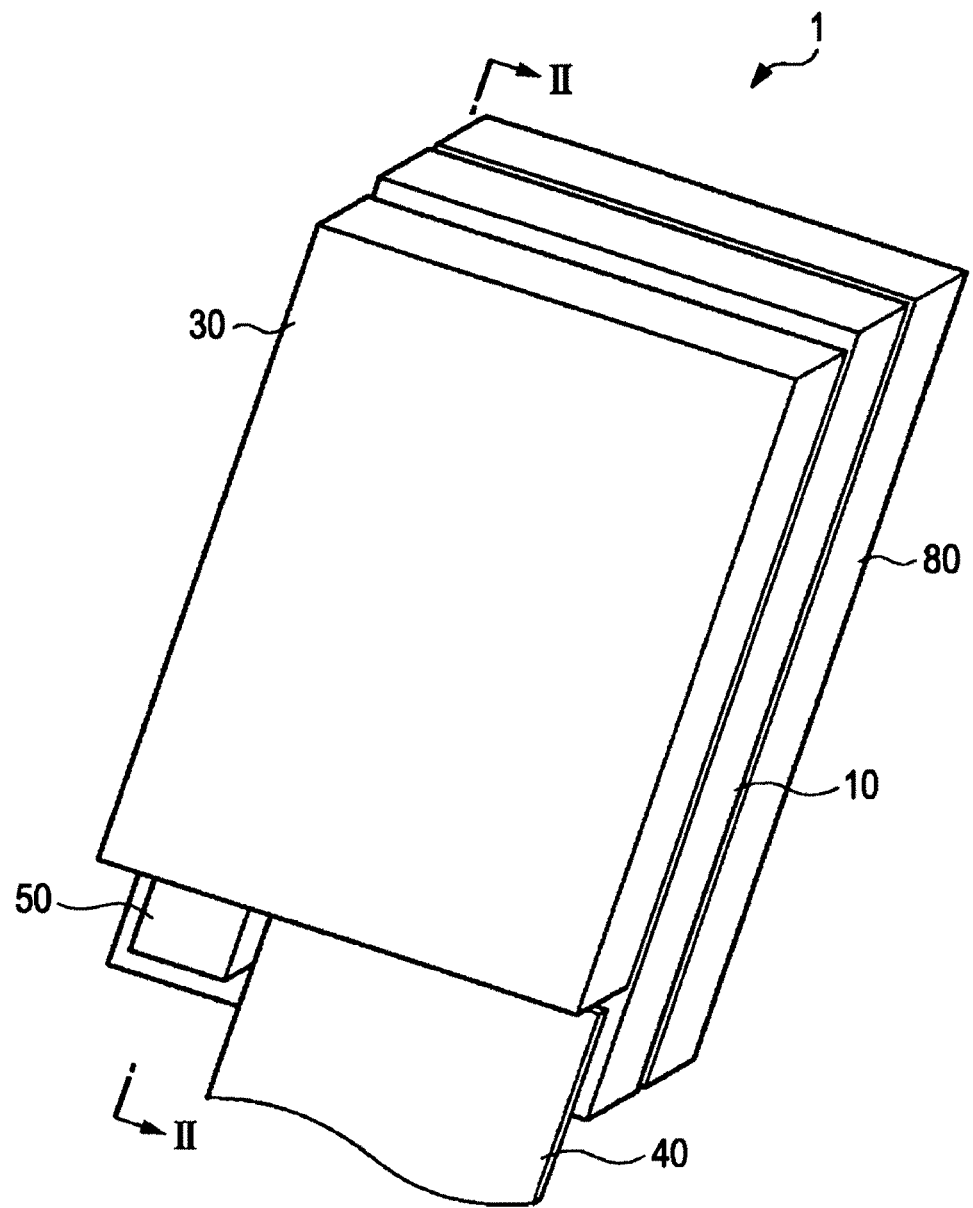
FIG. 1 is a perspective view schematically illustrating an image display apparatus according to a first embodiment of the invention.

FIG. 1 is a view schematically illustrating the perspective structure of an image display apparatus 1 according to the first embodiment of the invention. The image display apparatus 1 includes a driving circuit board 10 and a color filter (CF) board 30 facing each other, and a backlight 80 disposed at an opposite side of the driving circuit board 10, that is, the CF board 30. A light change structure 50 and a flexible printed circuit (FPC) board 40 are provided on the driving circuit board 10. The light change structure 50 has a function of selectively changing the light receiving amount of a light receiving sensor 20 (see FIG. 2), which will be described later, according to the attitude of the image display apparatus 1 with respect to the direction of gravitational force. The FPC board 40 is used for connecting the driving circuit board 10 to a main control board (not shown) in which an attitude determining unit, which will be described later, is provided. The attitude determining unit determines the attitude of the apparatus based on output from the light receiving sensor 20 which will be described later. The attitude determining unit will be described later.

Figure 2:
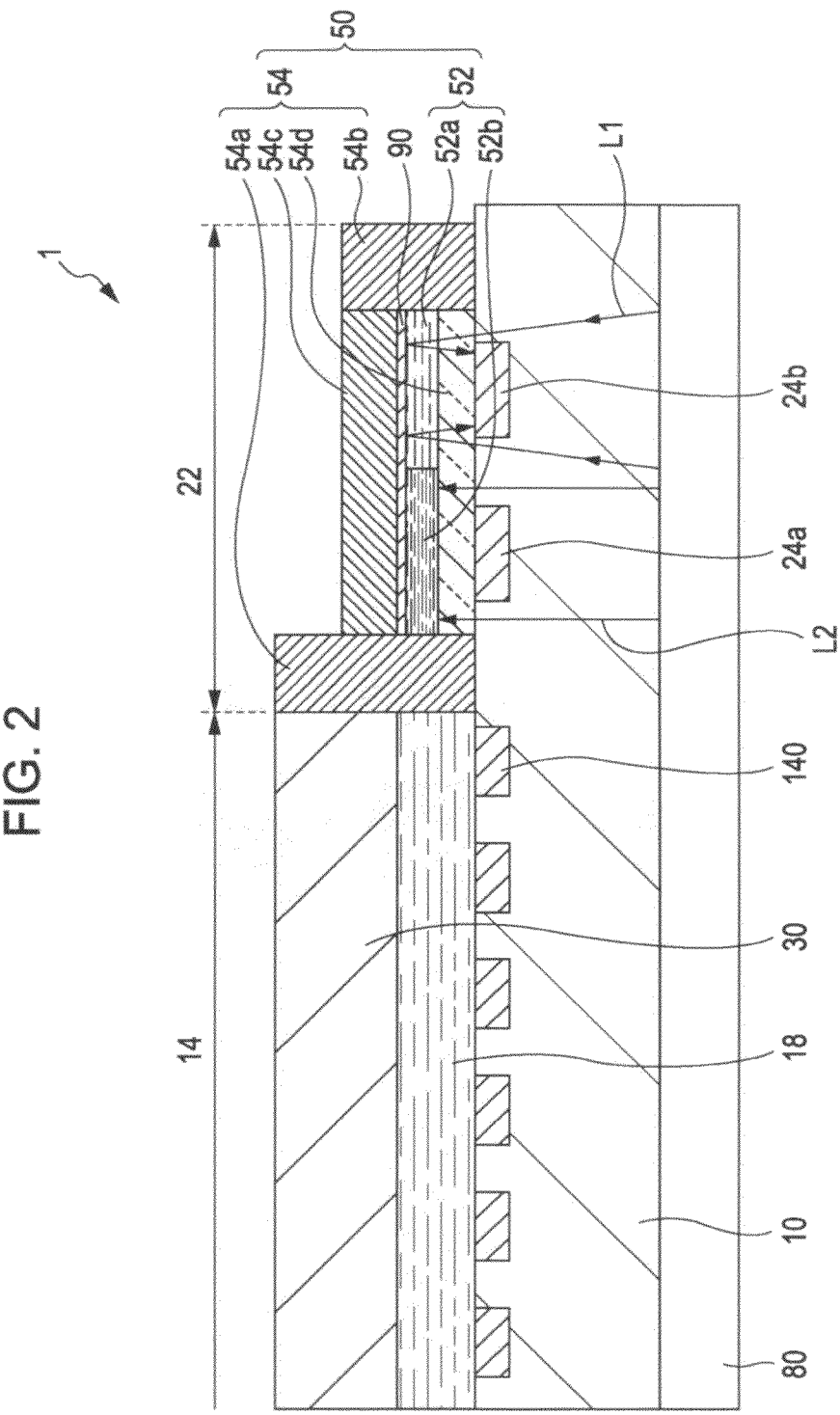
FIG. 2 is a schematic sectional view taken along line II-II of FIG. 1.
Figure 3:
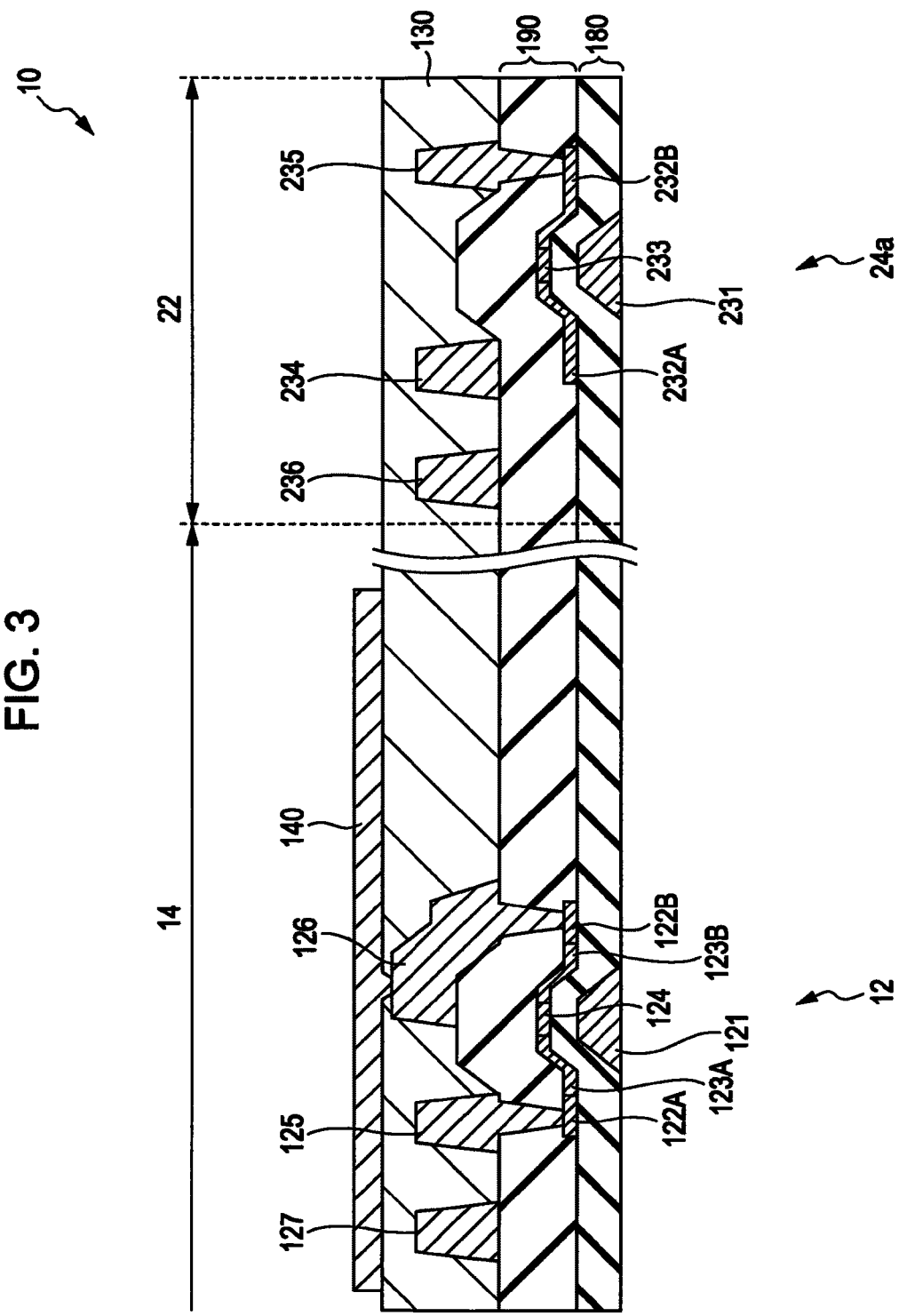
FIG. 3 is an enlarged sectional view illustrating main elements of a driving circuit board in an image display apparatus shown in FIG. 1.

FIG. 2 is a view schematically illustrating the sectional structure of the image display apparatus 1, which is taken along line II-II of FIG. 1 and FIG. 3 is an enlarged view illustrating the sectional structure of a driving element 12 and a light receiving sensor 20 which are formed on the driving circuit board 10 (not illustrated in FIG. 3) of the image display apparatus 1.

In the driving circuit board 10, a plurality of driving elements 12 (see FIG. 3) are formed through an insulating layer on a transparent board (not shown), such as a glass, at a predetermined pitch. The driving elements 12 are used for driving a plurality of display elements, for example, in an active matrix scheme. A region in which the driving elements 12 are formed constitutes an image display region 14.

Further, in the driving circuit board 10, the light receiving sensor 20 (see FIG. 5 which will be described later) including a plurality of light receiving elements 24a and the like are formed. The light receiving elements 24a and the like are light detecting elements capable of detecting an electric current, which flows when a light is irradiated onto a PN junction part of a semiconductor, as a voltage. For example, the light receiving elements 24a include a PIN (P-Intrinsic-N) photodiode, which uses a silicon semiconductor, and the like. A region in which the light receiving elements 24a and the like are formed constitutes a light receiving region 22. The driving elements 12, the light receiving elements 24a and the like, for example, can be formed on the same layer on the driving circuit board 10 through the same thin film process. Detailed configurations of the driving elements 12, the light receiving elements 24a and the like will be described later.

Between the driving circuit board 10 and the CF board 30, a liquid crystal layer 18 serving as a display element are sealed throughout the image display region 14. The liquid crystal layer 18 modulates a light, which passes therethrough, according to the state of an electric field, for example, can use liquid crystals of a transverse electric field mode such as a VA mode, an FFS mode or an IPS mode. Between the liquid crystal layer 18 and the driving circuit board 10 and between the liquid crystal layer 18 and the CF board 30, alignment layers (not shown) are formed. Further, a sealing layer (not shown) is formed in the vicinity of the liquid crystal layer 18 to seal the liquid crystal layer 18.

The CF board 30 is configured by forming an opposite electrode (not shown) and a color filter layer (not shown) on a transparent board (not shown). The color filter layer, for example, includes a red color filter layer, a green color filter layer and a blue color filter layer. These color filter layers of three colors are provided corresponding to each pixel electrode 140 (see FIG. 3).

The backlight 80 serves as a light source that emits an illumination light toward the image display region 14 and the light receiving region 22. The backlight 80 is disposed such that a light emitting surface thereof faces the light receiving region 22 as well as the image display region 14.

The light change structure 50 is provided in the light receiving region 22 where the light receiving sensor 20 of the driving circuit board 10 is formed. The light change structure 50 includes a light change material 52, which moves by itself according to the attitude of the image display apparatus 1 with respect to the direction of gravitational force and selectively changes the light receiving amount of each light receiving element of the light receiving sensor 20, and a containing section 54 in which the light change material 52 is movably contained. According to the embodiment, the light change material 52 includes a transparent first liquid 52a and an opaque second liquid 52b, which are separated from each other (without being mixed with each other). The containing section 54 includes light shielding materials 54a to 54c provided at the upper side and lateral sides thereof, and a transparent material 54d provided at the lower side (toward the backlight 80) thereof. The first liquid 52a and the second liquid 52b are sealed in a closed space surrounded by the light shielding materials 54a to 54c and the transparent material 54d. As the opaque second liquid 52b, for example, inorganic-based liquid material such as a mercury/metal complex solution, an organic-based coloring material and the like are used.

The transparent material 54d guides the light from the backlight 80 inside the light change structure 50, and the light shielding materials 54a to 54c prevents an external light from leaking inside the light change structure 50. A reflecting section 90 is formed on the upper inner surface of the closed space of the containing section 54 to reflect a light, which passes through the light change structure 50 after being emitted from the backlight 80, toward the light receiving sensor 20. It is preferred to perform a water repellent process with respect to the inner surface of the containing section 54, that is, a process of providing hydrophobicity to repel the first liquid 52a and the second liquid 52b. This is for facilitating movement of the first liquid 52a and the second liquid 52b in the containing section 54. A detailed configuration of the light change structure 50 will be described later.

As shown in FIG. 3, in relation to the driving element 12, a pixel Tr Gate 121 is provided on the driving circuit board 10, and a gate insulating layer 180 is formed to cover the pixel Tr Gate 121. On the gate insulating layer 180, a P– doped layer 124 serving as a channel at the time of driving, LDD layers 123A and 123B, and N+ doped layers 122A and 122B are formed. The P– doped layer 124, the LDD layers 123A and 123B, and the N+ doped layers 122A and 122B, for example, are commonly made of p-Si (polysilicon) and are obtained by controlling the amount of doped impurities. The N+ doped layers 122A and 122B are electrically connected to a source electrode 125 and a drain electrode 126 disposed through an interlayer film 190. A display signal line 127 is provided on the interlayer film 190, and a planarizing layer 130 is formed to cover the source electrode 125, the drain electrode 126 and the display signal line 127. A common electrode 140 is provided on the planarizing layer 130.

In relation to the light receiving sensor 20, a sensor gate 231 is provided on the driving circuit board 10, and the gate insulating layer 180 is formed to cover the sensor gate 231. On the gate insulating layer 180, a region 233 serving as an active region at the time of driving, a P+ doped layer 232A and a N+ doped layer 232B are formed. The region 233, the P+ doped layer 232A and the N+ doped layer 232B, for example, are commonly made of p-Si and are obtained by controlling the amount of doped impurities. The N+ doped layer 232B is electrically connected to a sensor power interconnection 235 (metal interconnection 26) disposed through the interlayer film 190. A GND 234 and a sensor signal line 236 (metal interconnection 26) are provided on the interlayer film 190, and the planarizing layer 130 is formed to cover the GND 234, the sensor power interconnection 235 and the sensor signal line 236. Thus, in a state in which a reverse voltage is applied to a PN junction including the P+ doped layer 232A, the region 233 and the N+ doped layer 232B, if the region 233 is exposed to a light, carriers are separated so that light current is generated. Therefore, a potential of an auxiliary capacitance (not shown) connected to the P+ doped layer 232A is changed, so that the potential is read through the sensor signal line 236 which is electrically connected to the auxiliary capacitance.

Such a light receiving sensor 20, for example, can be formed with a silicon semiconductor such as polysilicon (p-Si: polycrystalline), amorphous silicon (a-Si: amorphous silicon) and microsilicon (μ-Si: microcrystalline silicon). Particularly, it is preferred that the light receiving sensor 20 is formed by low temperature polysilicon.

Figure 4:
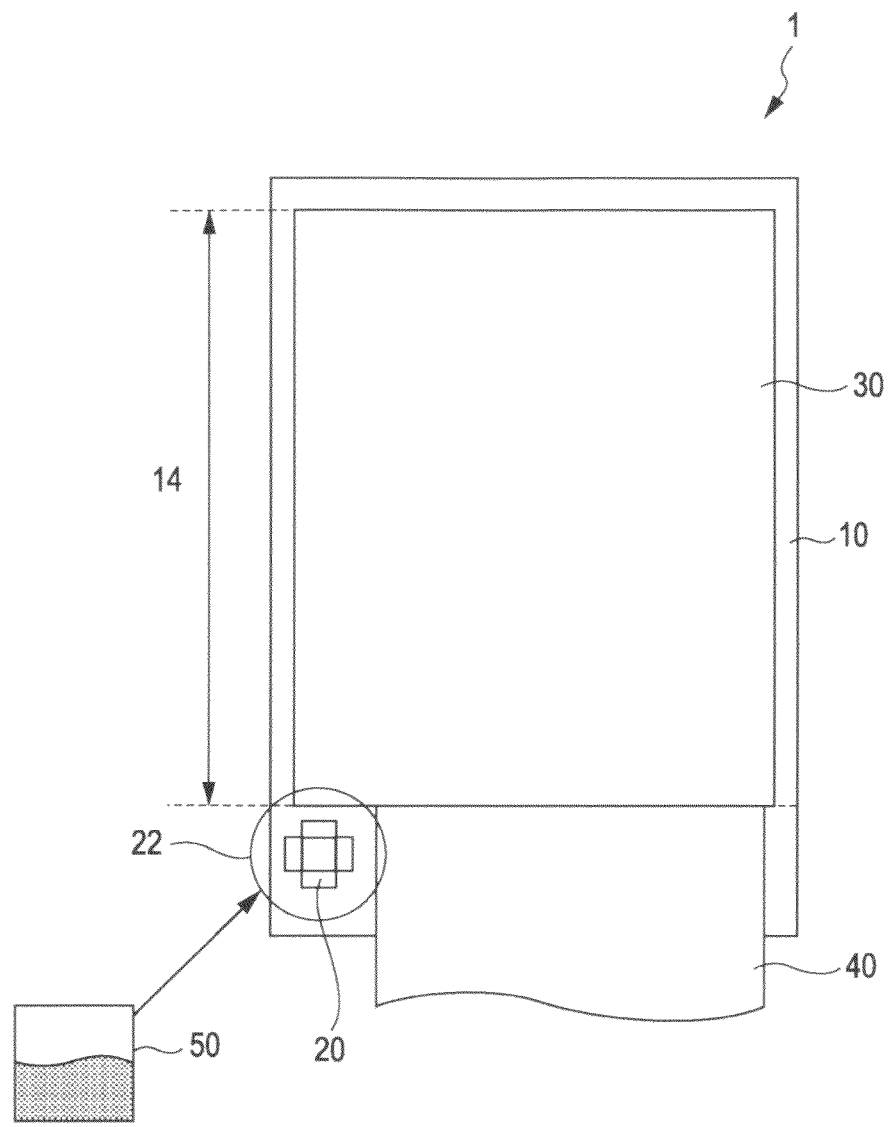
FIG. 4 is a schematic plan view illustrating an arrangement example of a light receiving sensor shown in FIG. 2.

FIG. 4 is a view schematically illustrating an arrangement position of the light receiving sensor 20 in the driving circuit board 10. FIG. 4 illustrates a state in which the light change structure 50 above the light receiving sensor 20 is separated. The light receiving sensor 20 is formed in the light receiving region 22 at the outer side of the image display region 14 of the driving circuit board 10, and the light change structure 50 is provided directly above the light receiving sensor 20. It is preferred that the light receiving sensor 20 is disposed in a position, which is adjacent to the FPC board 40, in the region of the driving circuit board 10. Since the position is a so called module dead space, the wasted space can be usefully utilized.

Figure 5:
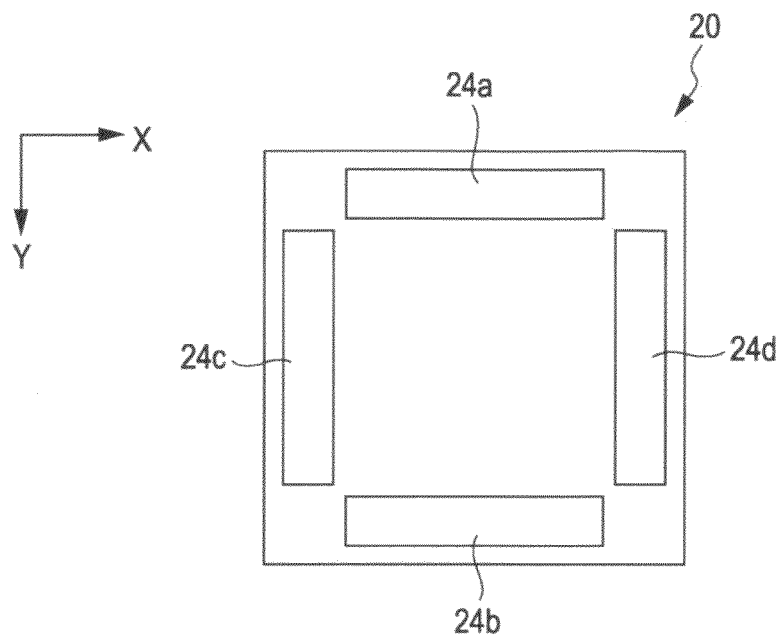
FIG. 5 is a schematic enlarged plan view illustrating an arrangement example of a light receiving sensor shown in FIG. 2.

FIG. 5 is an enlarged view schematically illustrating a planar arrangement configuration of the light receiving sensor 20 shown in FIG. 4. As described above, the light receiving sensor 20 includes the plurality of light receiving elements 24a to 24d. The light receiving elements 24a and 24b, and 24c and 24d are arranged in the X and Y directions at the same interval, respectively. In more detail, the light receiving elements 24a and 24b face each other along the Y direction, and the light receiving elements 24c and 24d face each other along the X direction. These four light receiving elements, for example, are spaced apart from each other by 0.3 mm or more.

Figure 6:
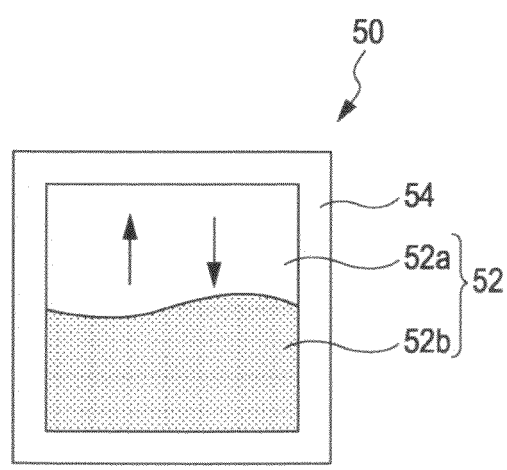
FIG. 6 is a schematic plan view illustrating a light change structure shown in FIG. 2.

FIG. 6 is a view schematically illustrating the configuration of the light change structure 50. The light change structure 50 is configured to cover the plurality of light receiving elements 24a to 24d (see FIG. 4). In the containing section 54 of the light change structure 50, the first liquid 52a and the second liquid 52b serving as light change materials, which have specific gravities and transmittances (light shielding characteristics) different from each other, are contained while being separated from each other. For example, the specific gravity and transmittance of the second liquid 52b is higher than the specific gravity and transmittance of the first liquid 52a. As the attitude of the apparatus with respect to the direction of gravitational force is changed, the first liquid 52a and the second liquid 52b freely move in the containing section 54, so that the first liquid 52a and the second liquid 52b are separated from each other in the vertical direction (direction of gravitational force). As a result, the light receiving amounts of the light receiving elements 24a to 24d of the light receiving sensor 20 are selectively changed. In a broad sense, the "light change material" represents a material that changes the amount of light received in the light receiving sensor. In the embodiment, the liquid that changes transmittance is used. Further, the "light shielding" represents both the complete shielding of light and "light reduction" including weakening of the light amount.

FIG. 7 is a diagram schematically illustrating the configuration of a light receiving circuit including the light receiving sensor 20. According to the embodiment, a pair of the light receiving elements 24a and 24b are connected to an attitude determining unit 70 through a comparator 72a, and a remaining of the light receiving elements 24c and 24d are connected to the attitude determining unit 70 through a comparator 72b. The comparator 72a compares the light receiving amount of the light receiving element 24a with the light receiving amount of the light receiving element 24b, and outputs a comparison result to the attitude determining unit 70 as a differential voltage Vout1. The comparator 72b compares the light receiving amount of the light receiving element 24c with the light receiving amount of the light receiving element 24d, and outputs a comparison result to the attitude determining unit 70 as a differential voltage Vout2. The attitude determining unit 70 determines the attitude of the image display apparatus 1 based on the differential voltage Vout1 from the comparator 72a and the differential voltage Vout2 from the comparator 72b.

[Operation]

Next, the operation of the embodiment will be described.

As shown in FIG. 2, the backlight 80 emits an illumination light toward the image display region 14 through the driving circuit board 10 to illuminate the liquid crystal layer 18, and emits an illumination light toward the light receiving region 22 through the driving circuit board 10. In the image display region 14, liquid crystal molecules (not shown) of the liquid crystal layer 18 are aligned corresponding to a pixel voltage applied between the pixel electrode 140 (see FIG. 3) and an opposite electrode (not shown), so that the illumination light of the backlight 80 is modulated. Thus, in the image display region 14, the display of an image is performed corresponding to an image signal.

Meanwhile, in the light receiving region 22, each light receiving element of the light receiving sensor 20 selectively receives the illumination light from the backlight 80. In more detail, after the illumination light from the backlight 80 selectively passes through the light change structure 50 and is reflected by the reflecting section 90, the illumination light selectively passes through the light change structure 50 again, and then reaches and received in the light receiving sensor 20.

In more detail, the light change structure 50 contains the transparent first liquid 52a and the opaque second liquid 52b, which are displaced in the containing section 54 in a state in which they are separated from each other in the vertical direction (direction of gravitational force) according to the attitude of the apparatus. Thus, an illumination light L1 of a part of the illumination light emitted toward the light receiving region 22 nearly passes through the first liquid 52a and goes toward the reflecting section 90. The illumination light L1 is reflected by the reflecting section 90, and then is incident into and received in a corresponding light receiving element (e.g., the light receiving element 24a) of the light receiving sensor 20 via the first liquid 52a. Further, an illumination light L2 of a part of the illumination light emitted toward the light receiving region 22 is blocked by the second liquid 52b. Thus, the illumination light L2 is rarely incident into a corresponding light receiving element (e.g., the light receiving element 24b) of the light receiving sensor 20.

FIGS. 8A to 8D are diagrams schematically illustrating a state of the light change material 52 of the light change structure 50 and arrangement of the light receiving elements of the light receiving sensor 20 when the attitude of the image display apparatus 1 is changed. As shown in FIG. 8A, when the attitude of a display screen D is vertically long, the light receiving element 24a and the light receiving element 24b of the light receiving sensor 20 are located in the vertical direction (direction of gravitational force), and the light receiving element 24c and the light receiving element 24d thereof are located in the horizontal direction (cd direction). At this time, the first liquid 52a and the second liquid 52b of the light change structure 50 are vertically separated from each other in correspondence with the direction of gravitational force. Thus, as shown in FIG. 8B, the illumination light L1 passes through the first liquid 52a and received in the light receiving element 24a. Meanwhile, the illumination light L2 is completely blocked by the second liquid 52b, and is rarely received in the light receiving element 24b. Each light receiving amount of the remaining pair of the light receiving elements 24c and 24d is about a half of the light receiving amount of the light receiving element 24a and the light receiving amount of the light receiving element 24b, and are substantially identical to each other. The attitude determining unit 70 determines that the light receiving element 24b having the minimum light receiving amount is located at the lower side of the containing section 54, and the light receiving element 24a having the maximum light receiving amount is located at the upper side of the containing section 54 based on the differential voltage Vout1 from the comparator 72a and the differential voltage Vout2 from the comparator 72b. Further, the attitude determining unit 70 determines that the light receiving elements 24c and 24d having the light receiving amounts, which are substantially identical to each other, are located in the horizontal direction (left and right direction). From the above result, the attitude determining unit 70 determines that the attitude of the image display apparatus 1, that is, the attitude of the display screen D is vertically long.

As shown in FIG. 8C, when the attitude of the image display apparatus 1, that is, the attitude of the display screen D is horizontally long, the light receiving element 24c and the light receiving element 24d of the light receiving sensor 20 are located in the vertical direction, and the light receiving element 24b and the light receiving element 24a thereof are located in the horizontal direction. At this time, the first liquid 52a and the second liquid 52b of the light change structure 50 move in the containing section 54 in correspondence with the variation of the attitude of the image display apparatus 1. As a result, as shown in FIG. 8D, the illumination light L1 passes through the first liquid 52a and received in the light receiving element 24c. Meanwhile, the illumination light L2 is completely blocked by the second liquid 52b, and is rarely received in the light receiving element 24d. Each light receiving amount of the remaining pair of the light receiving elements 24a and 24b is about a half of the light receiving amount of the light receiving element 24c and the light receiving amount of the light receiving element 24d, and are substantially identical to each other. The attitude determining unit 70 determines that the light receiving element 24d having the minimum light receiving amount is located at the lower side of the containing section 54, and the light receiving element 24c having the maximum light receiving amount is located at the upper side of the containing section 54 based on the differential voltage Vout1 from the comparator 72a and the differential voltage Vout2 from the comparator 72b. Further, the attitude determining unit 70 determines that the light receiving elements 24a and 24b having the light receiving amounts, which are substantially identical to each other, are located in the horizontal direction (left and right direction). From the above result, the attitude determining unit 70 determines that the attitude of the image display apparatus 1, that is, the attitude of the display screen D is horizontally long.

A display control in the main control board (not shown) performs a processing of switching the direction of the display of an image, which is displayed on the display screen D, according to the determination results of the attitude determining unit 70. Thus, the display of the image can be performed according to the direction of the attitude of the apparatus, and the convenience of a user can be improved.

Only when the difference among the light receiving amounts of the light receiving elements 24a to 24d exceeds a predetermined value, the attitude determining unit 70 may determine the attitude of the apparatus based on the difference among the light receiving amounts. Consequently, even if the attitude of the apparatus is headed to the plane, or even if the attitude of the apparatus is halfway (is not sufficiently headed in the vertical or horizontal direction), an appropriate process can be performed.

As described above, according to the embodiment, the light receiving sensor 20 is integrally formed with the driving circuit board 10 in which the driving elements are formed, and the light change structure 50 is provided in the region in which the light receiving sensor 20 is formed, so that the occupation space of a light receiving sensor can be reduced as compared with a case in which a light receiving sensor is provided separately from the driving circuit board 10. That is, as shown in FIG. 2, it is possible to achieve low profiling of the attitude detection structure as a whole including the light receiving sensor 20 and the light change structure 50. Further, since there is no necessity of separately preparing an electric signal interconnection member such as an FPC, which is necessary when a light receiving sensor is provided as a separate member, cost reduction can be achieved.

According to the embodiment, the light receiving operation of the light receiving sensor is performed using a part of the illumination light from the backlight 80 that illuminates the liquid crystal layer 18 as the display element, so that it is not necessary to separately provide a light emitting source. Further, the light receiving sensor 20 selectively receives the illumination light, which is emitted from the backlight 80 and reflected by the reflecting section 90, through the light change structure 50, so that the light receiving sensor can be formed and disposed in the driving circuit board 10 located between the backlight 80 and the light change structure 50.

<Modification>

Figure 9:
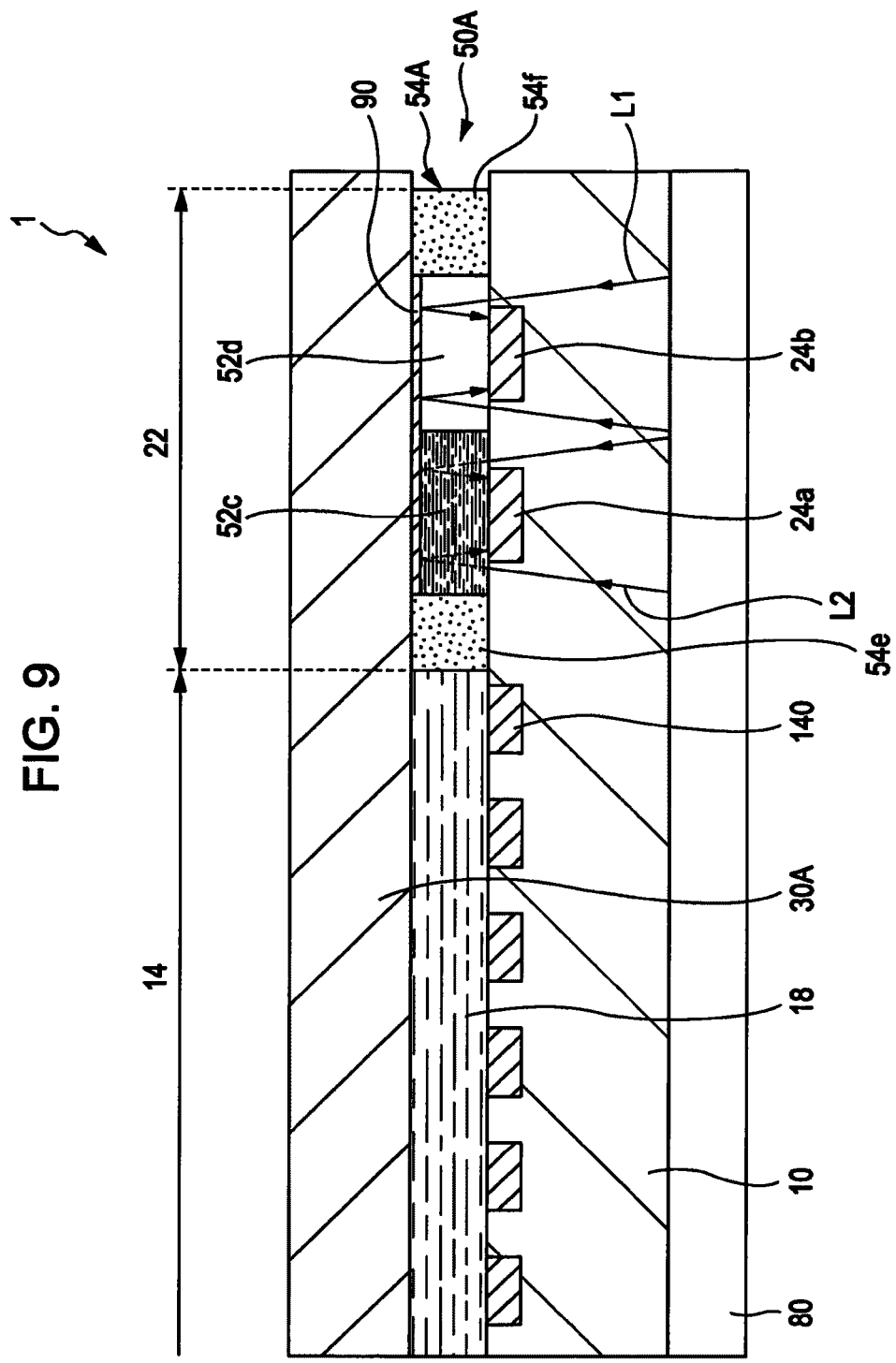
FIG. 9 is a sectional view schematically illustrating an image display apparatus according to a modification of the first embodiment.

FIG. 9 is a view schematically illustrating the sectional structure of an image display apparatus 2 according to the modification of the first embodiment of the invention. The same reference numerals are used to designate the same elements as those of the image display apparatus 1 according to the first embodiment, and detailed description thereof will be omitted in order to avoid redundancy.

[Apparatus Configuration]

In the image display apparatus 2, as the light change material 52 of a light change structure 50A, liquid crystals 52c, which are identical to the liquid crystal materials used for the liquid crystal layer 18 of the image display region 14, are used. That is, in the light change structure 50A, the liquid crystals 52c are encapsulated in a closed space (a containing section 54A) surrounded by sealing sections 54e and 54f at both side surfaces thereof, the driving circuit board 10 and a CF board 30A. In this way, the CF board 30A extends to the light receiving region 22 as well as the image display region 14. The reflecting section 90 is formed on the upper inner surface of the containing section 54A of the light change structure 50A. The reflecting section 90 has a function for reflecting light emitted from a backlight, and preventing external light from leaking in the light change structure 50A.

According to the modification, since the liquid crystals 52c are not fully filled in the containing section 54A but filled in the containing section 54A by about a half of the inner volume thereof, a remaining part is an airspace 52d (air or vacuum). This is for facilitating the movement of the liquid crystals 52c in the containing section 54A. In such a case, in order to facilitate the movement of the liquid crystals 52c, similarly to the first embodiment (see FIG. 2), it is preferred to perform a water repellent process with respect to the inner surface of the containing section 54A, that is, a process of providing hydrophobicity to repel the liquid crystals 52c.

[Manufacturing Process]

The light change structure 50A according to the modification, for example, can be formed as follows. That is, in an ODF (on-drop-filling) process of forming the liquid crystal layer 18 of the image display region 14, the liquid crystal materials used for the liquid crystal layer 18 are dropped onto the image display region 14, and liquid crystal materials (liquid crystals 52c), which are identical to the liquid crystal materials used, are also dropped onto a region surrounded by the sealing sections 54e and 54f of the light receiving region 22. The sealing sections 54e and 54f can be formed in advance by a method the same as a method of forming a sealing section (not shown) that surrounds the vicinity of the liquid crystal layer 18 of the image display region 14. Then, the region is sealed by the CF board 30A from the upper side. In this way, the formation of the liquid crystal layer 18 and the formation of the light change structure 50A containing the liquid crystals 52c can be simultaneously performed. In order to simplify the manufacturing process, it is preferred that, after the reflecting section 90 is formed in advance in a side of the CF board 30A, the reflecting section 90 is configured to be located on the upper inner surface of the containing section 54A when the light change structure 50A is sealed by the CF board 30A.

[Operation]

According to the modification, the liquid crystals 52c move in the containing section 54A of the light change structure 50A according to the attitude of the image display apparatus 2. Lights L1 and L2 emitted from the backlight 80 each reach the reflecting section 90 through the liquid crystals 52c and the airspace 52d. The light reflected by the reflecting section 90 is incident in the light receiving elements 24a and 24b through the liquid crystals 52c and the airspace 52d. Since the liquid crystals 52c as light change materials do not have light shielding effect, but have transmittance somewhat lower than transmittance of the airspace 52d, while the light is reciprocating the liquid crystals 52c, the light is reduced to a certain degree. That is, the liquid crystals 52c serve as a light reduction layer. Thus, the amount of the light L1 incident in the light receiving element 24a through the liquid crystals 52c is slightly reduced as compared with the amount of the light L2 incident in the light receiving element 24b through the airspace 52d, so that the difference occur between the output of the light receiving element 24a and the output of the light receiving element 24b. The difference is detected by the light receiving circuit shown in FIG. 7.

When the liquid crystal layer 18 and the liquid crystals 52c, for example, are rendered into black display when no voltage is applied as in the case of VA (vertical alignment) mode liquid crystals, an appropriate polarizing layer is inserted on a light path of the light change structure 50A, so that the liquid crystals 52c can serve as a light shielding layer that blocks most lights. In such a case, since the difference between the output of the light receiving element 24a and the output of the light receiving element 24b is increased, detection sensitivity is improved.

As described above, according to the modification, as the light change material 52 in the light change structure 50A, the liquid crystals 52c, which are identical to the liquid crystal materials used for the liquid crystal layer 18, are used, so that sealing of liquid crystals to the containing section 54A of the light change structure 50A can be performed when sealing of liquid crystals of the liquid crystal layer 18 is performed. That is, in a typical liquid crystal panel manufacturing process, the light change structure 50A can be simultaneously formed in a driving circuit board, and a particular process is not necessary. Thus, the manufacturing cost can be prevented from being increased without increasing the number of the entire manufacturing processes.

In the first embodiment and the modification, the light from the backlight typically provided in the image display apparatus is reflected and then received in the light receiving sensor. However, the invention can be applied to a display apparatus which is not provided with the backlight. For example, in the case of an display apparatus that performs image display by using self-light emission elements such as organic EL elements, after the organic EL elements are formed in a light receiving region as well as an image display region, a light receiving operation of a light receiving sensor may be performed by using lights from the organic EL elements.

Second Embodiment

FIG. 10 is a sectional view schematically illustrating an image display apparatus 3 according to the second embodiment of the invention. The same reference numerals are used to designate the same elements as those of the image display apparatuses according to the previous embodiment and the modification, and detailed description thereof will be omitted in order to avoid redundancy.

[Apparatus Configuration]

In the image display apparatus 3, as shown in FIG. 10, a light change structure 50B is provided. The light change structure 50B includes a transparent material 54g instead of the light shielding material 54c as compared with the light change structure 50 according to the first embodiment (see FIG. 2). That is, in the light change structure 50B, the first liquid 52a and the second liquid 52b are sealed in a containing section 54B surrounded by the light shielding materials 54a, 54b and 54d, and the transparent material 54g. The reflecting section 90 (see FIG. 2) is not provided.

In the image display apparatus 3, a light (an external incident light) incident from the outside of the image display apparatus 3 selectively passes the light change structure 50B, and then is selectively received in each light receiving element of the light receiving sensor 20. According to the embodiment, an emission surface of a backlight 280 is disposed to be headed only to the image display region 14 and does not extend to the light receiving region 22. A light receiving operation in the light receiving region 22 is performed using an incident light from an exterior (display screen-side), and a light from the backlight 280 is not necessary. Similarly to the first embodiment, even if the backlight 280 extends to the light receiving region 22, no problems occur. Other configurations are identical to those shown in FIG. 2.

[Operation]

Next, the operation of the embodiment will be described. As shown in FIG. 10, an external light from the display screen-side is incident toward the light receiving sensor 20 of the driving circuit board 10. An external light L3 of a part of the external light headed to the light receiving sensor 20 passes through the transparent first liquid 52a (or is slightly reduced), and is received in a corresponding light receiving element (e.g., the upper light receiving element 24a in the vertical direction) of the light receiving sensor 20. Further, an external light L4 of a part of the external light is nearly blocked by the opaque second liquid 52b. Thus, the external light L4 received in a corresponding light receiving element (e.g., the lower light receiving element 24b in the vertical direction) of the light receiving sensor 20 does not nearly exist. Consequently, the light receiving amounts of the plurality of light receiving elements 24a to 24d of the light receiving sensor 20 are selectively changed. Similarly to the first embodiment, the attitude determining unit 70 determines the attitude of the image display apparatus 3 with respect to the direction of gravitation force based on the differential voltage Vout1 from the comparator 72a and the differential voltage Vout2 from the comparator 72b.

As described above, according to the embodiment, the light receiving operation by the light receiving sensor 20 is performed using the external light, so that the attitude of the image display apparatus 3 is detected. Consequently, there is no necessity of extending the backlight 280 to a region facing the light receiving region 22, and miniaturization thereof is possible. Further, the invention can be easily applied to a display apparatus (e.g., a display apparatus using organic EL elements) which is not provided with a backlight.

<First Application>

Figure 11A:
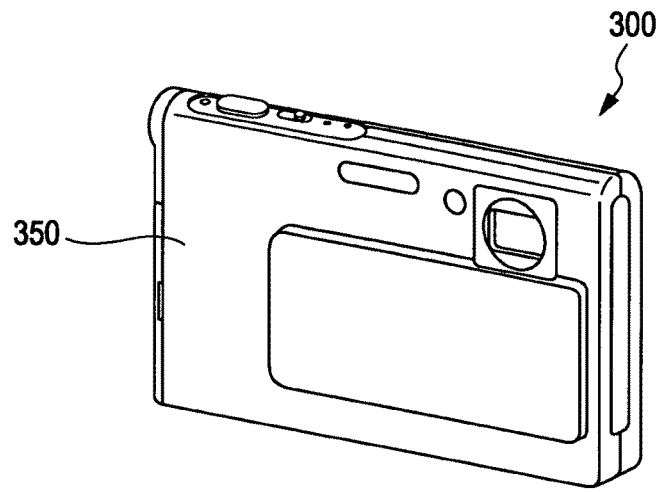
Figure 11B:
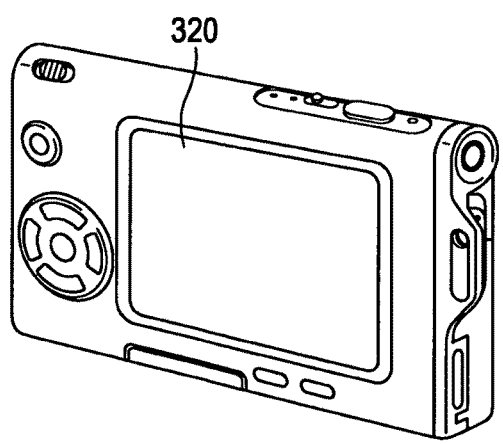

FIGS. 11A and 11B are views illustrating a digital camera 300 as an electronic apparatus according to the third embodiment of the invention. FIG. 11A is a front view of the digital camera 300 and FIG. 11B is a rear view of the digital camera 300. The same reference numerals are used to designate the same elements as those of the image display apparatuses according to the previous embodiments and the modification, and detailed description thereof will be omitted in order to avoid redundancy.

The digital camera 300 includes an image display unit 320 and a control unit 350. Further, the digital camera 300, for example, includes a light emitting unit for a flash, a menu-switch, a shutter button and the like. The image display unit 320 according to the embodiment corresponds to the image display apparatus according to the previous embodiments and the modification. Thus, the attitude of the digital camera 300 can be detected according to the light receiving amount of the light receiving sensor 20 of the image display unit 320. In addition, the direction of display of the image display unit 320 may vary depending on variation in the detected attitude of the digital camera 300.

<Second Application>

Figure 12:
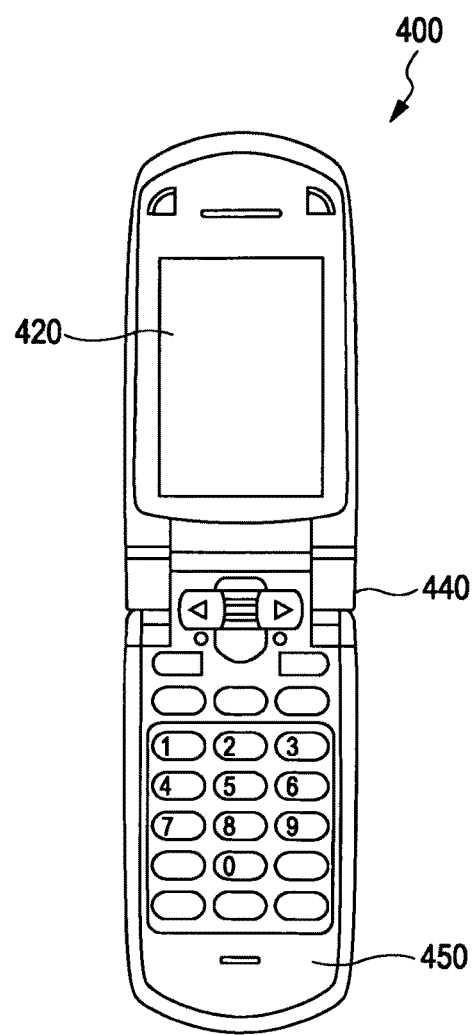
FIG. 12 is a view illustrating an external appearance of a cell phone as another application of an image display apparatus.

FIG. 12 is a view illustrating a cell phone 400 as an electronic apparatus according to the fourth embodiment of the invention. The same reference numerals are used to designate the same elements as those of the image display apparatuses according to the previous embodiments and the modification, and detailed description thereof will be omitted in order to avoid redundancy.

The cell phone 400 includes an image display unit 420 and a control unit 450. Further, the cell phone 400, for example, is provided with dial buttons, a transceiver and the like. The image display unit 420 according to the embodiment corresponds to the image display apparatus according to the previous embodiments and the modification. Thus, the attitude of the cell phone 400 can be detected according to the light receiving amount of the light receiving sensor 20 of the image display unit 420. In addition, the direction of display of the image display unit 420 may vary depending on variation in the detected attitude of the cell phone 400 or variation in the attitude of the image display unit 420 when the cell phone 400 is rotated about a hinge part 440.

<Third Application>

Figure 13:
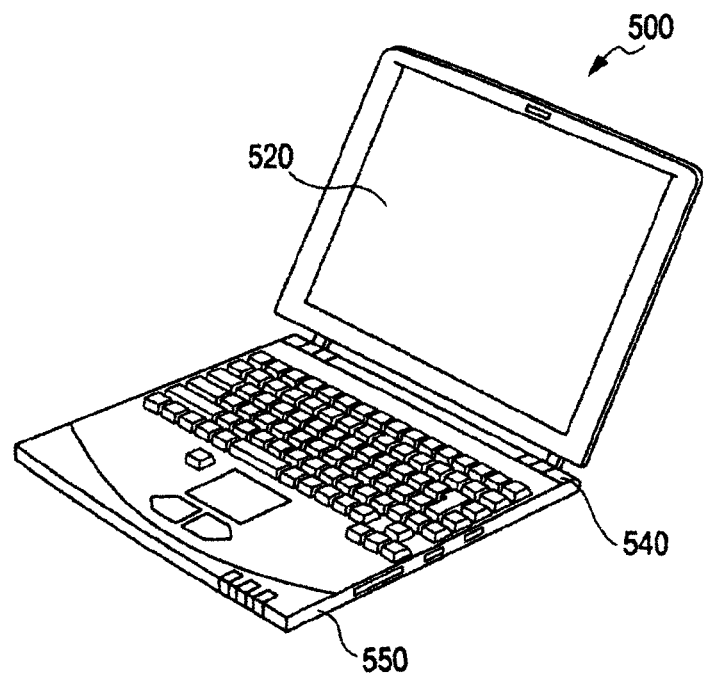
FIG. 13 is a view illustrating an external appearance of a personal computer as another application of an image display apparatus.

FIG. 13 is a view illustrating a personal computer (PC) 500 as an electronic apparatus according to the fifth embodiment of the invention. The same reference numerals are used to designate the same elements as those of the image display apparatuses according to the previous embodiments and the modification, and detailed description thereof will be omitted in order to avoid redundancy.

The PC 500 is a notebook-type PC and includes an image display unit 520 and a control unit 550. Further, the PC 500, for example, is provided with a keyboard for input of characters and the like. The image display unit 520 according to the embodiment corresponds to the image display apparatus according to the previous embodiments and the modification. Thus, the attitude of the PC 500 can be detected according to the light receiving amount of the light receiving sensor 20 of the image display unit 520. In addition, the direction of display of the image display unit 520 may vary depending on variation in the detected attitude of the PC 500 or variation in the attitude of the image display unit 520 when the PC 500 is rotated about a hinge part 540.

<Fourth Application>

Figure 14:
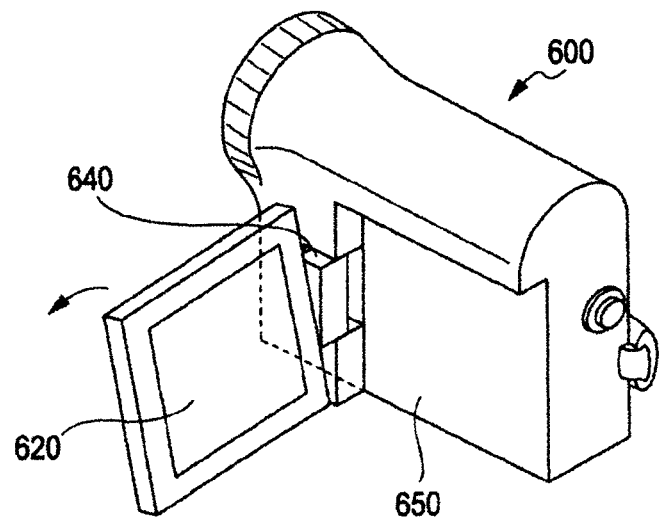
FIG. 14 is a view illustrating an external appearance of a video camera as another application of an image display apparatus.

FIG. 14 is a view illustrating a video camera 600 as an electronic apparatus according to the sixth embodiment of the invention. The same reference numerals are used to designate the same elements as those of the image display apparatuses according to the previous embodiments and the modification, and detailed description thereof will be omitted in order to avoid redundancy.

The video camera 600 includes an image display unit 620 and a control unit 650. Further, the video camera 600, for example, is provided with a lens used for photographing an object or a start/stop switch used for photographing the object. The image display unit 620 according to the embodiment corresponds to the image display apparatus according to the previous embodiments and the modification. Thus, the attitude of the video camera 600 can be detected according to the light receiving amount of the light receiving sensor 20 of the image display unit 620. In addition, the direction of display of the image display unit 620 may vary depending on variation in the detected attitude of the video camera 600 or variation in the attitude of the image display unit 620 when the video camera 600 is rotated about a hinge part 640.

Other Embodiments

The invention has been described based on the several embodiments. However, the invention is not limited thereto. That is, various modifications can be made.

Figure 15:
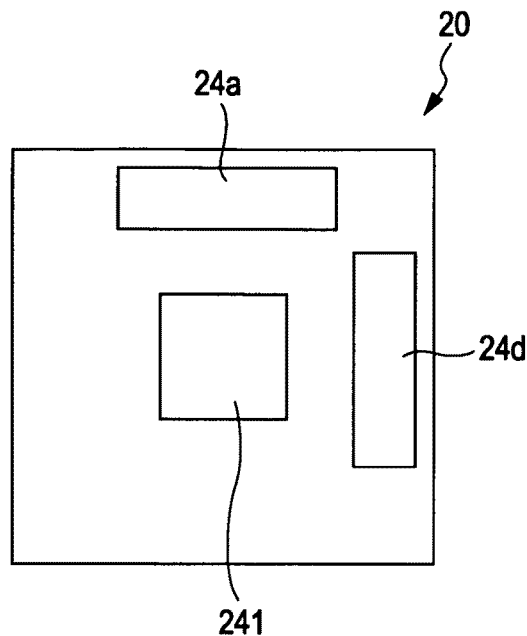
FIG. 15 is an enlarged plan view schematically illustrating another arrangement example of a light receiving sensor.

For example, in the previous embodiments, the light receiving sensor 20 includes four light receiving elements 24a to 24d. However, the number of the light receiving elements of the light receiving sensor 20 is not limited to four. An arbitrary number of light receiving elements can be provided if the attitude of the apparatus can be determined. For example, as shown in FIG. 15, it may be possible to employ a light receiving sensor 20A including three light receiving elements, that is, a light receiving element 24l provided at the center of a light receiving region, a light receiving element 24d provided at a right side of the light receiving element 24l, and a light receiving element 24a provided at an upper side of the light receiving element 24l. With such a configuration, the attitude of the apparatus can be determined based on the difference between the output of the light receiving element 24l and the output of the light receiving element 24a, and the output of the light receiving element 24l and the output of the light receiving element 24d. In such a case, as compared with the previous embodiments, the number of the light receiving elements can be reduced, and the light receiving circuit can be simplified.

Figure 16:
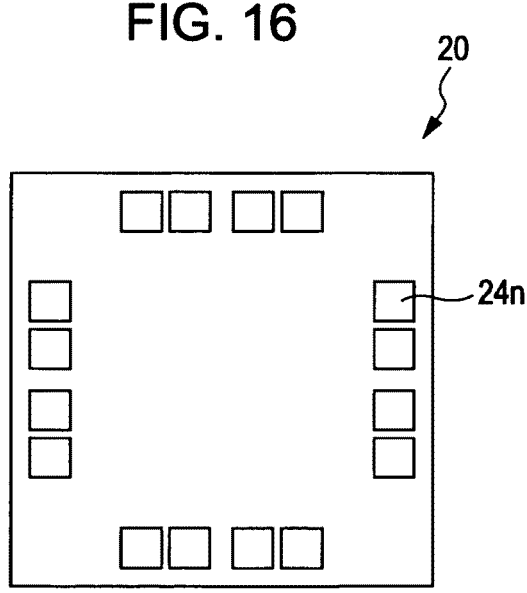
FIG. 16 is an enlarged plan view schematically illustrating further another arrangement example of a light receiving sensor.

Further, for example, as shown in FIG. 16, a plurality of light receiving elements $24_n$ (n=1 to k) may be provided by dividing the light receiving element of the light receiving sensor 20. In the example shown in FIG. 16, each of the light receiving elements 24a to 24d according to the first embodiment (see FIG. 5) is divided into four, so that the total 16 light receiving elements $24_1$ to $24_{16}$ are generated. In such a case, if the light change structure is configured using the light change material including liquids similarly to the previous embodiments, since a light receiving circuit is a so to speak simple leveling circuit, even if the direction of the display screen D is nearly headed to the horizontal direction, the attitude of the apparatus can be detected.

Figure 17:
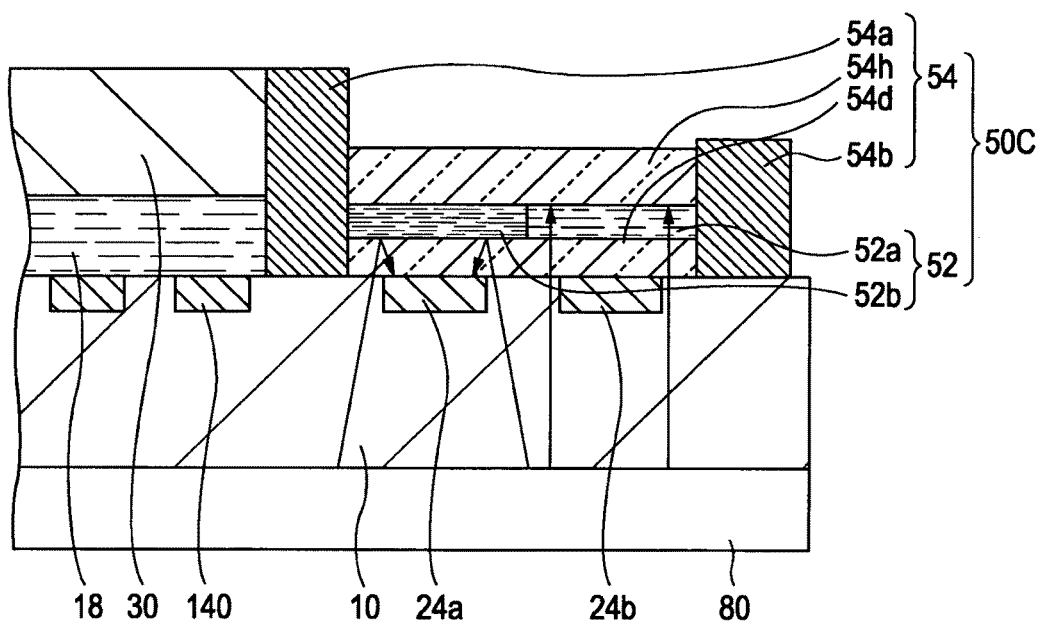
FIG. 17 is a sectional view schematically illustrating an image display apparatus according to another modification of the first embodiment.

Further, in the previous embodiments, the attitude of the apparatus is detected using the transparent first liquid 52a and the opaque second liquid 52b as the light change material 52, and the light change materials having transmittances different from each other. Alternatively, liquids having reflectances different from each other may be used. In such a case, for example, as shown in FIG. 17, a liquid (e.g., mercury) having a high reflectance (absorbance) is used as the second liquid 52b and a liquid (e.g., water) having a lower reflectance is used as the first liquid 52a. Further, the reflecting section 90 is not necessary and, instead, a light absorbing material 54h is provided. In such an example, a light emitted from the backlight 80 toward the second liquid 52b is reflected by the surface of the second liquid 52b, and is received in the corresponding light receiving element 24a. Meanwhile, a light emitted from the backlight 80 toward the first liquid 52a is absorbed by the first liquid 52a, or absorbed by the light absorbing material 54h after passing through the first liquid 52a, and rarely reaches the corresponding light receiving element 24b. The attitude determining unit 70 determines that a light receiving element having a large light receiving amount is located at a lower side in the vertical direction, and a light receiving element having a small light receiving amount is located at an upper side in the vertical direction. In addition, as the light change material 52, a combination of the first liquid 52a, which is non-reflective, and the second liquid 52b which is reflective, is not used, but a combination of a single reflective liquid sealed in a containing section and vacuum or air may be used.

Figure 18A:
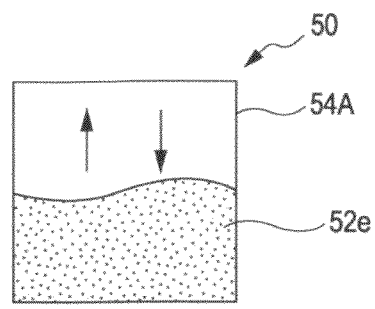

Further, in the previous embodiments, a liquid is used as the light change material 52. However, for example, as shown in FIGS. 18A to 18D, materials other than the liquid may be used. In detail, as shown in FIG. 18A, the light change material 52 may be light change powder. In such a case, light change powder 52e is movably contained in the containing section 54A such that airspace (vacuum or air) remains. The light change powder 52e, for example, may be light shielding powder such as carbon black or reflective powder such as metal particles.

Figure 18B:
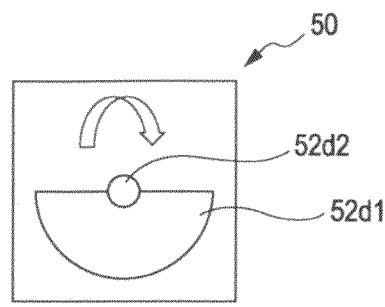
Figure 18C:
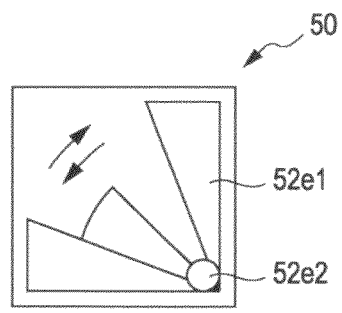
Figure 18D:
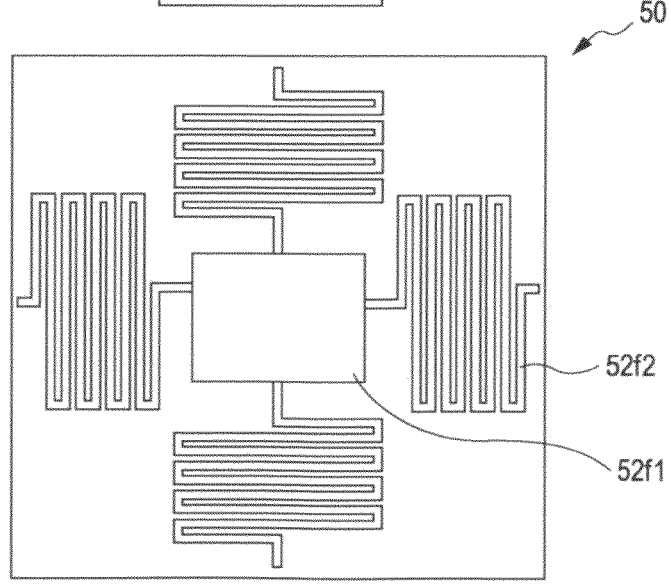

Further, as shown in FIG. 18B, the light change material 52 may be a pivoting member 52d1 having a fan shape, which is pivotally supported about a rotating shaft 52d2. In addition, as shown in FIG. 18C, the light change material 52 may be a pivoting member 52e1 having a fan shape, which is pivotally supported about a rotating shaft 52e2. Further, as shown in FIG. 18D, the light change material 52 may be formed with a weight member 52f1 in such a manner that the weight member 52f1 is movably supported by a spring member 52f2. In such a case, when forming a metal interconnection such as the sensor power interconnection 235, the GND 234 and the sensor signal line 236 of the driving element 12, it is possible to form the weight member 52f1 and the spring member 52f2 by using materials which are identical to materials used for forming the metal interconnection. In FIGS. 18B to 18D, the pivoting member 52d1, the pivoting member 52e1 and the weight member 52f1 may be formed with a light shielding material, or a reflective material.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
a circuit board integrally formed with a driving element for driving a display element and a light receiving sensor for receiving a light;
a light change structure provided in a region of the circuit board, in which the light receiving sensor is formed, and includes a light change material that selectively changes a light receiving amount of the light receiving sensor by moving by itself according to an attitude with respect to a direction of gravitational force; and
an attitude determining unit that determines the attitude based on the light receiving amount of the light receiving sensor,
in which the light change structure includes a weight member as the light change material and a spring member which movably supports the weight member.

2. The image display apparatus according to claim 1, wherein the light change material in the light change structure includes a light shielding material.

3. The image display apparatus according to claim 1, wherein the light change material in the light change structure includes a reflective material.

4. The image display apparatus according to claim 1, wherein the circuit board includes a metal interconnection connected to the driving element and the light receiving sensor, and the weight member and the spring member are formed by a material identical to a material of the metal interconnection.

5. The image display apparatus according to claim 1, wherein the display element is a liquid crystal element.

6. The image display apparatus according to claim 5, further comprising a backlight for illuminating the liquid crystal element, wherein the light receiving sensor selectively receives a part of the light from the backlight through the light change structure.

7. The image display apparatus according to claim 6, further comprising a reflecting section, wherein the light receiving sensor selectively receives light, which is emitted from the backlight and reflected by the reflecting section, through the light change structure.

8. The image display apparatus according to claim 1, wherein the light receiving sensor selectively receives external incident light through the light change structure.

9. The image display apparatus according to claim 1, wherein the light receiving sensor includes a plurality of light receiving elements, and the attitude determining unit determines the attitude based on difference among light receiving amounts of the plurality of light receiving elements.

10. The image display apparatus according to claim 9, wherein the attitude determining unit determines the attitude based on the difference among the light receiving amounts only when the difference among the light receiving amounts of the plurality of light receiving elements exceeds a predetermined value.

11. The image display apparatus according to claim 1, wherein a display direction of an image displayed by the display element is switched in response to a determination result by the attitude determining unit.

12. An electronic apparatus comprising:
an image display unit; and
a control unit that controls the image display unit,
wherein the image display unit includes:
a circuit board integrally formed with a driving circuit including a driving element for driving a display element and a light receiving sensor for receiving light;
a light change structure provided in a region of the circuit board, in which the light receiving sensor is formed, and includes a light change material that selectively changes a light receiving amount of the light receiving sensor by moving by itself according to an attitude with respect to a direction of gravitational force; and
an attitude detection processing unit that determines the attitude based on the light receiving amount of the light receiving sensor, in which the light change structure includes a weight member as the light change material and a spring member which movably supports the weight member.

* * * * *